United States Patent

Lindsey

[15] 3,699,510
[45] Oct. 17, 1972

[54] BOREHOLE DATA TRANSMISSION SYSTEM

[72] Inventor: James M. Lindsey, Houston, Tex.

[73] Assignee: Sperry Sun Well Surveying Company, Sugar Land, Tex.

[22] Filed: Nov. 21, 1969

[21] Appl. No.: 879,011

[52] U.S. Cl. .................................. 340/18 CM
[51] Int. Cl. ................................... G01v 1/22
[58] Field of Search ............... 340/15.5 CM, 18 CM

[56] References Cited

UNITED STATES PATENTS

| R25,209 | 7/1962 | Kolb | 340/15.5 CM |
|---|---|---|---|
| 3,103,644 | 9/1963 | Burton | 340/15.5 CM |
| 3,015,801 | 1/1962 | Kalbfell | 340/15.5 J |
| 2,679,757 | 6/1954 | Fay | 340/15.5 CM |
| 3,427,580 | 2/1969 | Brock | 340/15.5 CM |

Primary Examiner—Benjamin A. Borchelt
Assistant Examiner—N. Moskowitz
Attorney—George L. Church, Donald R. Johnson, Wilmer E. McCorquodale, Jr. and John E. Holder

[57] ABSTRACT

The particular embodiment described herein as illustrative of one form of the invention utilizes an instrument system for detecting the angular position and directional orientation of a housing within a wellbore and for generating signals indicative of such information. These signals are stored in binary form and then coded for transmission to the surface over a conductor which also carries the power supply for the system. At the surface the signals are decoded to provide data indicative of downhole information.

35 Claims, 8 Drawing Figures

INVENTOR
JAMES M. LINDSEY
ATTORNEY

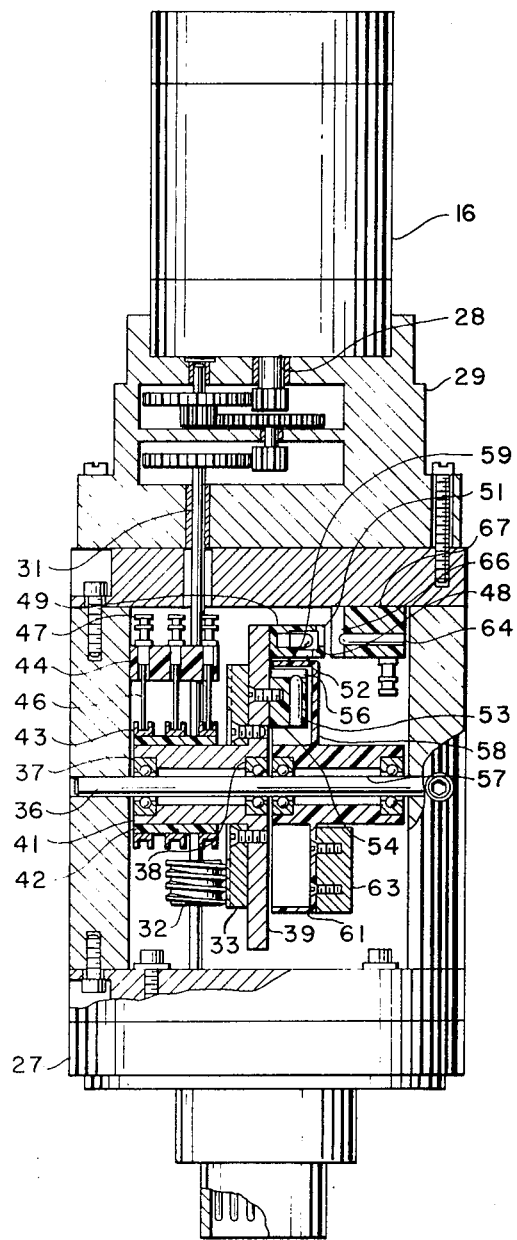
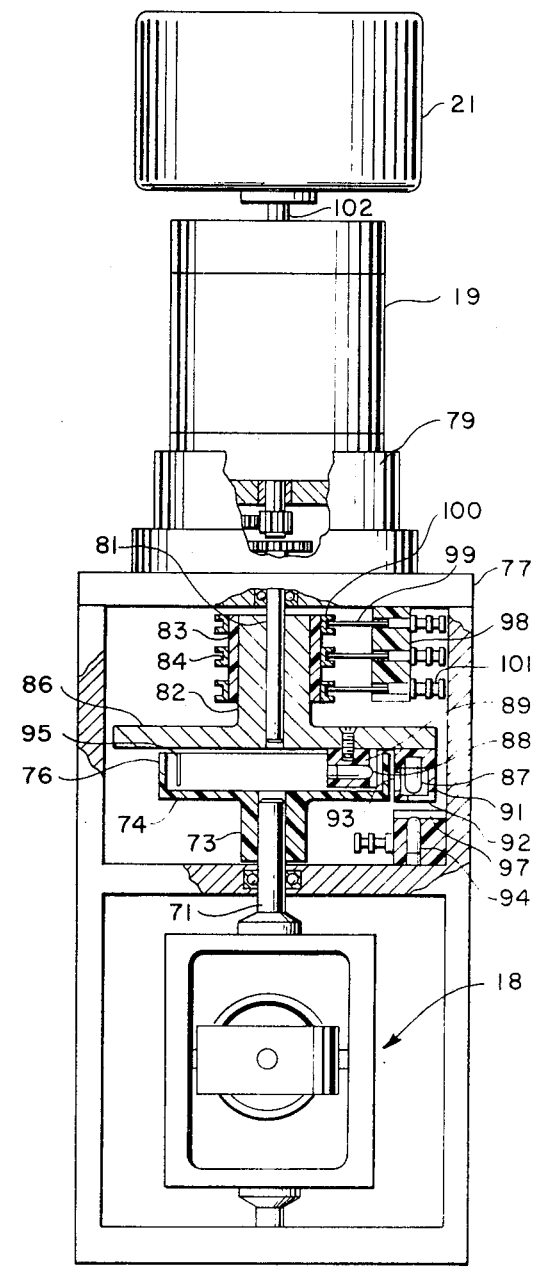
FIG. 2
FIG. 3

INVENTOR
JAMES M. LINDSEY
John E. Holder
ATTORNEY

INVENTOR
JAMES M. LINDSEY
ATTORNEY

BOREHOLE DATA TRANSMISSION SYSTEM

BACKGROUND OF THE INVENTION

This invention relates to a data transmission system and more particularly to a system for sensing a parameter at one location and providing an electrical signal indicative of the parameter for transmission to a remote location over a single conductor.

During the drilling of boreholes in the earth, it is often desirable to determine the attitude of the hole, not only at the bottom of the hole, but throughout its traverse of earth formations. It is for this reason that various apparatus and methods have been devised for making such determinations of borehole attitude. Normally such systems consist of apparatus for measuring the angular disposition of the hole with respect to some reference such as horizontal reference plane, and in addition, means for determining the direction of the hole with respect to a reference such as Magnetic North. A typical apparatus for making such determinations of a borehole position consists of an instrument unit, including a compass or a gyro, together with an angular unit having a plumb-bob arrangement, and a photographic device of some sort for making a photographic recording of the instruments in the wellbore. In the past, these instruments have been run on wirelines or go-deviled into the drill pipe where they are subsequently retrieved as in the latter case, by removing the drill pipe from the borehole. Upon retrieval of the instrument to the surface, the photographic equipment is removed and the exposed film record of the instrument recordings is then removed to a suitable location for developing the film. Thereafter, if calculations are to be made regarding the orientation of the borehole, such information derived from the film can then be utilized in computation equipment for making such determinations. In any event, the procedure outlined above is time consuming, and if decisions for continuing drilling or for making changes in the orientation of the wellbore are required, then such decisions must be held in abeyance until the film is developed and computations can be made from the indicated parameters of the well borehole. In other borehole instrument system, multiple conductor cables are used to power instruments and transmit data to the surface representative of the instrument functions. The number of conductors of course is determinative of the size and cost of conductor lines and a single conductor cable is preferable for these reasons.

It is therefore an object of the present invention to provide a new and improved system for transmitting logic from a borehole apparatus to the surface.

SUMMARY OF THE INVENTION

With this and other objects in view, the present invention contemplates a system for use in a borehole within the earth for detecting and sending signals to the surface, which signals are indicative of a parameter within the borehole.

The downhole apparatus may be comprised of separate units for detecting different parameters such as those associated with the orientation of the borehole. Such units provide signals indicative of detected parameters for transmission to the surface. The present invention utilizes means for storing data downhole representative of various detected parameters and sequencing such data for insertion on a conductor for transmittal to the surface. The data information is decoded at the surface, resequenced, and supplied to a computer or readout equipment for use in calculating conditions dependent upon such parameters.

A complete understanding of this invention may be had by reference to the following detailed description, when considered in conjunction with the accompanying drawings, illustrating embodiments thereof.

BRIEF DESCRIPTION OF THE DRAWINGS

FIG. 2 is a partial cross-sectional view of a wellbore instrument for measuring the angular orientation of the instrument within the wellbore;

FIG. 3 is a partial cross-sectional view of a wellbore instrument for measuring the directional orientation of the instrument within the wellbore;

DESCRIPTION OF THE PREFERRED EMBODIMENTS

The data transmission system which is the subject of this invention is described in conjunction with a borehole tool for detecting positional parameters of an instrument within a borehole, and transmitting such data to the surface. There the data is processed and recorded in a form permitting a direct read-out of borehole orientation.

Figures 1, 8:
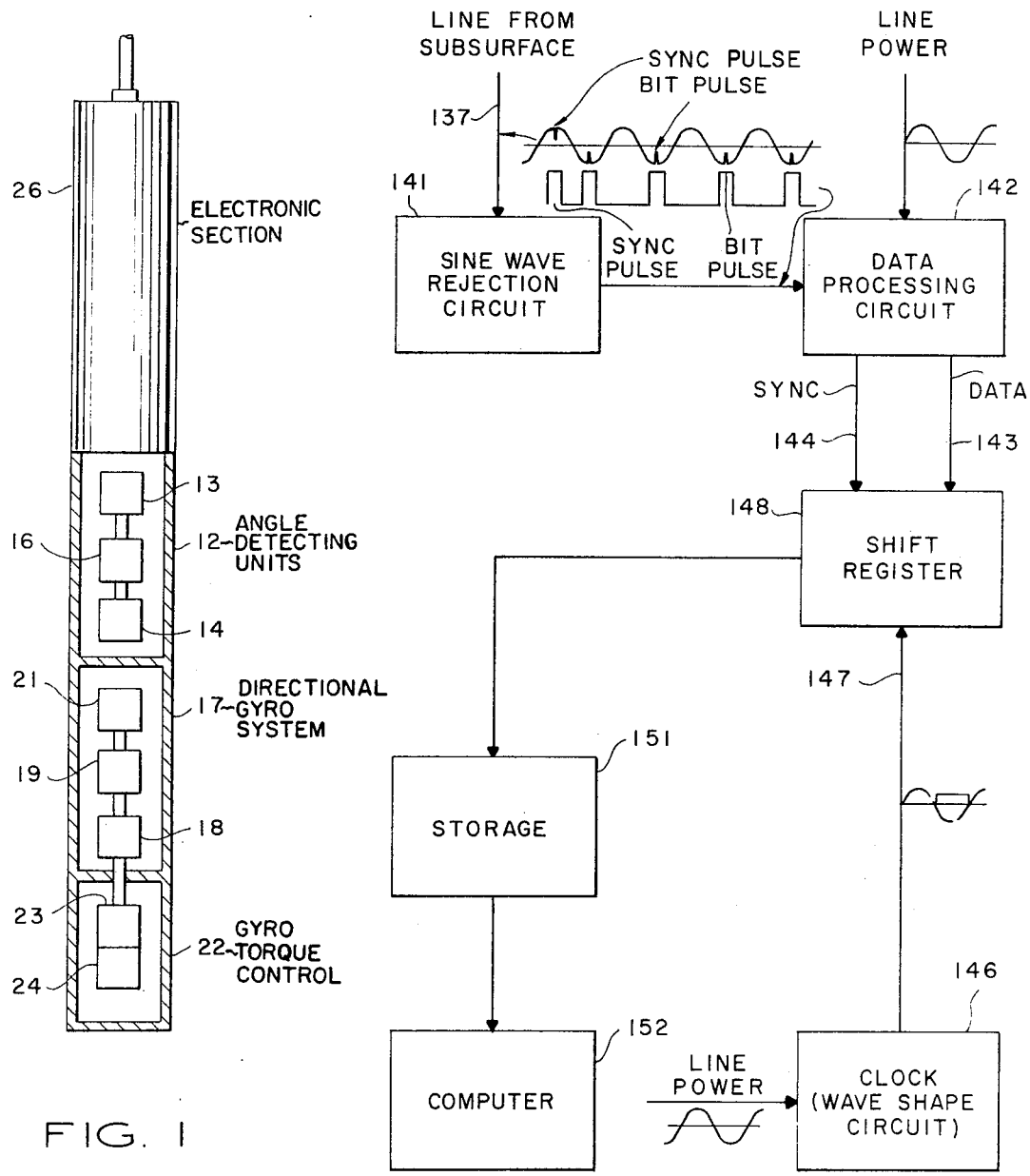
FIG. 1 is a schematic view of a wellbore tool including instruments for measuring angular and azimuthal parameters of the tool position.
FIG. 8 is a schematic circuit diagram showing surface equipment for decoding the data and processing same to obtain wellbore information.

FIG. 1 shows a schematic of such a wellbore tool which includes an angle detecting section 12 having first and second angle detecting units 13 and 14 mounted therein to measure the angular disposition of planes in section 12 which are 90° to one another. A synchronous motor 16 is positioned between the units to provide a source of power for driving scanning systems within the units to thereby monitor parameters of the detecting units which are indicative of their angular disposition. The motor 16 has output shafts extending upwardly and downwardly therefrom to drive the respective scanning systems for the first and second units 13 and 14. A directional section 17 is positioned below the angle detecting section and includes mechanisms for measuring the directional orientation of the housing relative to the earth's surface. The directional section 17 incorporates a gyroscope 18, a gyro motor 19, and an encoder 21 for providing a reference signal to the detecting units. A lower section 22 houses a gyro torque motor 23 and a torque motor circuit 24 for controlling precessing of the gyro. An upper electronic section 26 of the tool houses an electronic scanner circuit and data counter and storage units.

An angle detecting unit for generating signals indicative of the angular position of the instrument within the borehole is shown in detail in FIG. 2 of the drawings. The angle unit includes a partially enclosed housing 27, having the synchronous motor 16 mounted at its upper end. The motor has an output shaft driven at 3,600 rpm. Between the synchronous motor and housing is mounted a transmission or gear reduction section 29 which has two stages of pinon gears connected with the output shaft 28 of the synchronous motor for reducing the output revolution thereof. The output of the gear reduction section is fed through a shaft 31 which extends longitudinally from the upper to the lower end of the instrument housing. At the lower end of the output shaft, a worm gear 32 is rotated therewith for driving s spiroid gear 33, which in turn drives a scanning system within the instrument. The total gear reduction between the output of the synchronous motor and the rotation of the spiroid gear within the instrument housing is from 3,600 rpm of the motor to 20 rpm of the spiroid gear 33.

The angle detector and scanning system are located within the housing and include a horizontal shaft 36 extending transversely across the housing midway between its ends. A scanner assembly is rotatably mounted about the left side of the shaft as viewed in FIG. 2, and is provided with bearings 37, 38 for rotatably supporting the assembly about the shaft. The scanner assembly is comprised of a large diameter vertical disc 39 upon one side of which is mounted the circular spiroid gear section 33. The spiroid gear is arranged to mesh with the worm gear 32 on the shaft 31 extending vertically through the housing. A sleeve 41 extends outwardly from the vertical disc 39, and is positioned about the horizontal shaft 36. An insulating cylinder 42 is positioned about the sleeve. Grooved commutator rings 43 are positioned about the insulator. The grooved commutators are electrically insulated from one another to provide separate electrical flow paths between the stationary portion of the instrument housing and the rotating scanner section. An insulating post 44 is positioned above the commutators and is connected to the side wall of the housing. Brushes 46 extend downwardly from the post into contact with the commutators. The upper ends of the brushes are connected to terminal posts 47 to provide a means for electrically connecting the brushes with conductor wires (not shown) within the instrument housing.

Referring again to the vertical disc 39 of the scanner section, a lamp 48 and lamp housing 49 are shown extending outwardly from the outer rim of disc 39 toward the center of the housing. A first slit 51 is formed in the outer wall of the lamp housing and is perpendicular to the shaft 36. A second slit 52 is formed along the bottom portion of the lamp housing 49 and is parallel with the shaft 36. A detector photocell 53 and housing 54 are mounted on the disc 39 and extend outwardly from the disc on the same side as the lamp 48 and housing 49. Wires (not shown) extend from the photocell through the disc and into contact with the commutator rings. The photocell housing has a slit or opening 56 in its upper side wall and parallel to the shaft 36 to permit light emanating from lamp 48 to project into the housing for activating the photocell. Conductor wires are also provided to the lamp housing from the commutator rings to provide an electrical power source to the lamp.

A pendulum assembly is also mounted on the horizontal shaft 36 opposite the scanner assembly. The pendulum assembly is comprised of an annular sleeve 57 positioned about the shaft and rotatably supported thereon by means of bearings at each end of the annular sleeve. A circular shield 58 extends outwardly from the sleeve and includes an L-shaped portion 59 extending inwardly therefrom toward the circular disc 39 of the scanner section. The inwardly extending portion 59 of the shield approaches contact with the vertically mounted disc 39, but does not contact the disc, so that the pendulum assembly is free to move independently with respect to the scanner assembly. The shield and its inwardly extending portion are arranged to pass over and about the detector photocell 53 and housing 54. The inwardly extending portion of the shield passes between the bottom of the lamp housing 49 and the upper side of the photocell detector housing 54. A slit 61 is formed in the inwardly extending portion of the sleeve in parallel relationship with the slit 52 formed in the lower side of the lamp housing. A weighted pendulum member 63 is connected to the shield 58 and covers a partial segment of the shield. This weighted pendulum member maintains the shield in an oriented position relative to gravity, regardless of the position of the housing with respect to gravity, since the pendulum assembly is freely mounted for rotation upon the horizontal shaft 36. The slit 61 in the inwardly extending portion 59 of the shield is positioned at a point thereon corresponding to a point on the periphery of the weighted pendulum member 63 directly below the center of gravity of the weighted member when the member is at free rest relative to gravity.

Also mounted within the interior of the housing is a second or reference photocell or other such light sensitive device 64, which is positioned at the upper end of the interior portion of the instrument housing opposite a point on the path of movement of the lamp 48. A vertical slit 66 is provided within the outer wall of a photocell housing 67, which slit is arranged to be oppositely disposed and parallel to the slit 51 in the lamp housing 49. Conductor wires (not shown) provide an electrical power source for the photocell 64.

In the operation of the apparatus just described, the synchronous motor 16 is continuously driving the gear reducing mechanism to rotate the spiroid gear 33 and scanner disc at a rate of 20 revolutions per minute or 1 revolution every 3 seconds. This means that the lamp 48 on the scanner disc 39 will pass in front of the reference photocell 64 on the interior wall of the housing, once every three seconds. The lamp 48 is continuously energized. As a result, the reference photocell will be activated to generate a signal once every 3 seconds for purposes to be hereinafter described.

As the scanner disc and lamp continue to rotate during each revolution, a second signal is generated when the lamp 48 passes the slit 61 in the inwardly extending portion of the pendulum shield. The slit 61 permits light from the lamp to impinge upon the detector photocell 53 which is positioned on the scanner disc 39 next to the lamp 48. The shield normally prevents the lamp from activating the photocell 53, except when the lamp and photocell pass the slit 61 in the pendulum once during each revolution of the disc. The slit in the shield is positioned relative to the gravitational pull of the weighted pendulum member, so that even though the housing is tilted at an angle with respect to the vertical, the shield will remain in a constant position determined by the force of gravity. Therefore, the slit 61 in the shield will always remain at the bottom (relative to earth's gravity) of the pendulum shield. As the lamp 48 and photo detector cell 53, which are mounted on the scanner disc, move past the slit 61 in the pendulum shield at its lower side, the light emanating from the lamp will pass through the slit and be projected upon the detector photocell, which in turn generates a signal that is picked up from the commutator rings and brushes for purposes to be hereinafter described.

It is readily seen that as the scanning disc 39 rotates, a pulse is generated once every three seconds by the case reference photocell 64, and that a second pulse is generated at some time lapse after the first case reference photocell pulse is generated, depending upon the position of the slit 61 in the pendulum shield relative to the case reference photocell. If, for example, the instrument housing were lying in a horizontal position with respect to the surface of the earth, the scanner, if operating in a clockwise direction, (as viewed from the right side as shown in FIG. 2) would generate a first signal when the lamp 48 passes the slit 66 in the case reference photocell housing. 90 rotational degrees thereafter, the scanner would generate a second signal when the lamp 48 passes the slit 61 in the pendulum shield to activate photocell 53. If the time rate of rotation of the scanning disc 39 is known, then the actual number of degrees transgressed by the scanning mechanism between such first and second signals may be calculated.

In order to provide completely accurate information as to the angular position of the instrument housing with respect to a vertical reference plane, it is desirable to utilize the second angle detecting unit 14, which is mounted so that the scanning disc and pendulum shield of the second instrument are in a vertical perpendicular to that of the plane of the shield and disc in the first instance. As will be described hereinafter, the data outputs of each of the pendulum instrument sections is fed to a data processing unit where a vector summation of the outputs provides a true calculation of the angular disposition of the instrument housing.

Referring now to FIG. 3 of the drawings, details of the directional unit 17 (FIG. 1) are shown. Directional unit 17 provides information relative to the directional or azimuthal orientation of the instrument housing. The unit shown in FIG. 3 is very similar to that of FIG. 2 in that a scanning section is rotated relative to a shield, which instead of being oriented by a pendulum, is driven by the rotation of the vertical shaft 71 of the directional gyroscope 18. The vertical or output shaft 71 of the gyroscope is shown connected to a vertical sleeve 73, which is press fitted onto the output shaft of the gyro. The sleeve has an outwardly extending shield portion 74 which in turn has an upwardly extending circular shield wall 76. The gyro instrument housing 77 has a synchronous motor 19 and gear reduction section 79 mounted on its upper side, with the output shaft 81 of the gear section extending through the top of the instrument housing 77 and downwardly into the instrument. Bearings are provided in the top of the instrument housing to rotatably support the motor driven output shaft.

A scanning section is mounted on the motor driven output shaft for rotation within the instrument housing. The scanner section is comprised of a vertical sleeve 82 attached to the lower end of the shaft. The sleeve has an insulated cylinder 83 about its outer walls upon which are mounted commutator rings 84 which are electrically insulated from one another. At the lower end of the scanner sleeve, a horizontally disposed circular disc or plate 86 is shown extending outwardly therefrom. A scanning lamp 87 is attached to the lower side of the circular disc near its outer rim and extends downwardly therefrom. A detector photocell 88 is also attached to the under side of the disc and is mounted within a detector photocell housing 89. A housing 91 is also disposed about the lamp, and is provided with a first horizontal slit 92 on the bottom side of the housing, and a second vertical slit 93 on the inner wall of the lamp housing. The upwardly extending vertical wall 76 of the shield is positioned between the scanning lamp 87 and detector photocell 88 mounted on the scanning disc. A slit 95 is formed in the vertical wall of the shield. A case reference photocell 94 is mounted within a housing 96 upon the inner wall of the instrument housing in a spaced relation with the outer rim of the scanner disc and the lamp 87. Clearance is provided between the reference photocell housing 96 and the lamp housing 91. A slit 97 is provided in the top side of the case reference photocell housing to permit light emanating from the lamp housing to impinge upon the photocell 94.

An insulating block 98 is shown extending downwardly from the upper end of the instrument housing. The block holds horizontally disposed brushes 99 therein for contacting commutator rings 100 on the scanning sleeve. Terminals 101 are connected to the brushes to provide electrical contact with conducting wires (not shown) for supplying electrical power to the lamp and for transmitting a signal from the detector photocell to electrical circuitry within the instrument. Likewise, suitable conductor wires are connected with the case reference photocell to provide a means for transmitting a signal therefrom to such electrical circuitry within the instrument housing.

Operation of the gyro unit in the instrument is similar to that described above with respect to the pendulum units. The reference photocell on the azimuth unit is photocell 88. The slit 95 which permits light from lamp 87 to impinge upon photocell 88 is oriented with respect to the tool housing and one of the pendulum units which in turn is oriented with respect to a surface oriented reference such as Magnetic North. While the gyro unit housing turns in the wellbore, the gyro and slit 95 remain oriented with respect to Magnetic North. Thus, when the scanner lamp 87 passes the slit 95, the associated flip flop is triggered on; when the scanner lamp passes slit 97 to operate photocell 94, the flip flop is triggered off. The pulses passed during this time span are indicative of azimuthal degrees of difference between Magnetic North and the reference photocell 94 on the gyro unit housing.

Directional unit 17 which houses the gyro and scan system described above also includes the encoder mechanism 21. Shaft 102 extends upwardly from the motor 19 of the instrument for driving the encoder 21. The output shaft from the motor is rotated at 3,600 rpm, or 60 revolutions per second. The encoder is arranged to be run from the output shaft of the motor and to multiply such rotation of the output shaft as to provide 12,000 pulses per second from the encoder.

The gear reduction section 79 is placed between the output shaft of the motor and the scanning device in the instrument housing so that the scanner is operated at 20 rpm or 1 revolution every 3 seconds. Therefore, when the scanning mechanism has made one revolution within the instrument housing, in 3 seconds, the encoder or pulse generator has produced 36,000 pulses. This relationship between the encoder pulses and the scanner rotation readily permits a determination of degrees of scanner rotation between signals from the first and second photocells to an accuracy of 0.01°. It is also seen that synchronization between the scanning mechanism in the instrument and the pulses generated by the encoder prevents any variation in the power supply from affecting the readout. Any variation in the operation of the motor from its intended 3,600 rpm will provide a proportional relationship between the rotational speed of the scanner and the output pulses from the pulse generator. The motor driving the angle detecting units is driven synchronously with motor 19 and encoder pulses from encoder 21 are also provided to circuitry for reading the angle units.

Figure 4:
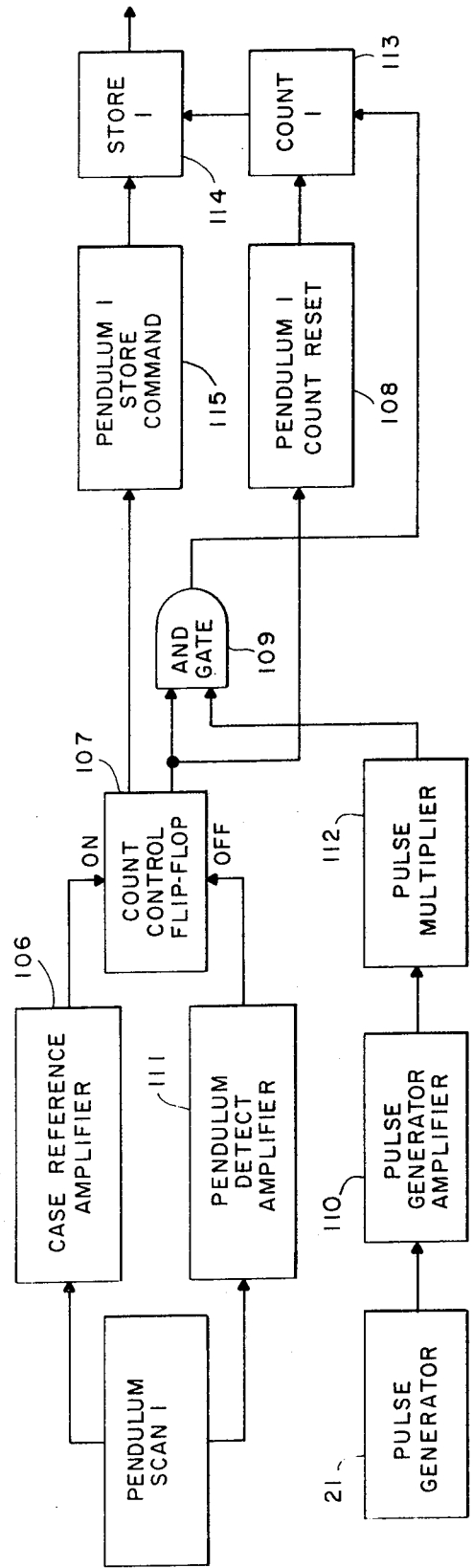
FIG. 4 is a schematic circuit diagram showing a system for converting instrument data to digital pulses and counting and storing such data.

Referring now to FIG. 4 of the drawings, a schematic representation of an electrical system for utilizing the information derived from the angle and azimuth units is shown. When pendulum 1 scans past the case reference photocell, the lamp on the pendulum activates the photocell, and causes it to send a signal to a case reference amplifier 106. The amplifier shapes the signal and passes it to trigger "on" a count control flip flop 107. The flip flop 107 has a number of control functions. First, on the rise of the trigger "on" signal from the case reference amplifier, that is, as the output of amplifier 106 rises to a positive potential, the flip flop 107 sends an output signal to a count reset circuit 108, which also is an amplifying and pulse shaping circuit. The output of the count reset circuit is a 5 microsecond pulse that resets pendulum 1 binary counting units 113 to zero. The 16 binary counting units for receiving the output of pendulum 1 are in the form of a series of flip flops in ripple count configuration to provide a sixteen bit counter.

A second control function of the count control flip flop 107 is to provide a gate control signal to a pendulum 1 "AND" gate 109. A second input to the pendulum 1 gate 109 is comprised of continuous pulses that are generated by the pulse generator or encoder 21. The pulses from the pulse generator have been shaped in an amplifier and shaper circuit 110 and multiplied at 112 so that the input frequency of pulses to the gate is 12,000 pulses per second. Therefore, when a signal is received from the count control flip flop 107 into the pendulum 1 gate 109, the gate will pass the oncoming pulses from the pulse generator that appear on its other input, such pulses being passed to the pendulum 1 binary counting units.

Thereafter, in the pendulum instrument section (FIG. 2), when the lamp 48 on the scanner has moved around the pendulum and passes the slit 61 on the pendulum shield, the lamp 48 activates the detector photocell 53 to send a signal to a pendulum detector amplifier 111. This signal to the pendulum detector amplifier is passed to the count control flip flop 107 and causes the flip flop to turn off. This in turn removes the potential from one leg of the pendulum 1 AND gate 109, causing it to stop passing pulses from the pulse generator to the pendulum 1 counting units.

At the time that the count control flip flop 107 turns off, its decaying signal provides still a third control function. The decaying signal activates a pendulum 1 store command circuit 115 which is an amplifying and pulse shaping circuit. The output of the store command circuit is a five micro-second pulse that commands memory or storage units 114 in association with the counting units to store all the contents of the pendulum 1 counters. The storing units 114 are a series of flip flops slaved to look at information in the counter on command from the pendulum storage command, and to store either a 1 or 0, that is a voltage or no voltage, which is present in the counter 113 at the time. Thus, the counters are continuously gathering data from the instrument units and on command, storing it.

This same sequence of the events described above is also taking place in the circuitry associated with the second pendulum and the gyro, which circuitry is, in all significant respects, identical to that of the pendulum circuit. After this sequence of events has taken place, meaningful data is stored in the memory or storage units of pendulum 1, pendulum 2, and the gyro, such storage being in either straight binary or binary coded decimal form.

To review the operation of the electrical circuitry thus far described, the pendulum and gyro scanning systems provide a first signal upon activation of a case reference photocell to pulse a count control flip flop 107. The output of flip flop 107 operates a gate 109 which when operated, passes pulses from pulse generator 21 to the ripple counter 113. The scanning system then provides a second signal upon activation of a detector photocell. The second signal turns count control flip flop 107 off and thus closes AND gate 109 to stop pulses to the ripple counter 113. The decaying signal from the count control flip flop 107 generates a signal in the store command circuit 115 which in turn activates the storage units 114 to store the binary information in the ripple counter. Thus every time the scanning system measures the angular distance between the reference and detector photocells, pulses in time proportion to such angular distance operate the ripple counter and the count is then stored.

The method for relating such pulse count to angular measurement can be illustrated for example by reference to the pendulum 1 instrument. When the scanning lamp passes the case reference photocell, the pendulum 1 flip flop 107 is triggered on which in turn sends its output signal to AND gate 109. This output opens gate 109 to permit the passage of pulses generated by the pulse generator 21 to the data count and storage units 113 and 114 respectively. Such a signal from the flip flop 107 will continue until the lamp 48 on the scanner passes the slit 61 in the pendulum shield to generate a signal from the detector photocell 53. This output passes through amplifier 111 to cause flip flop 107 to turn off and thereby close gate 109. The gate will thus cease passing the pulses generated by the pulse generator to the data counter 113. For example, if the scanner lamp 48 takes 1 ½ seconds to move from the reference photocell to the detector photocell, the flip flop will be outputting a signal for 1 ½ seconds. During this time span, 18,000 pulses from the pulse generator will be passed by the pendulum 1 gate 109 to the data counter 113. Since the scanner rotates at a rate of one revolution every three seconds, the scanner will have moved in the 1 ½ seconds over an arc of 180.00°, thus the detector photocell is located 180° from the reference photocell. This indicates that the detector housing is in a vertical position, and that therefore the wellbore is in a vertically oriented position, since the slit 66 in the reference photocell, which is at the top of the housing is in fact 180° away from the slit 61 in the pendulum shield which is located at the bottom center of the pendulum.

Operation of the gyro unit in the instrument is similar to that described above with respect to the pendulum units. Since the gyro unit is referenced to the pendulum units and Magnetic North, the readings from these units may be combined to give a true angular and azimuthal orientation of the tool housing. First the outputs of the angle units are summed vectorially to provide an angle of inclination of the housing.

Then, if the gyro unit output indicates that the housing has rotated X degrees from North, the pendulums have moved the same amount and the vector summation is likewise rotated X degrees. The resultant computation gives the angular disposition of the housing relative to Magnetic North or similar surface reference.

The next step is to transfer the information contained in the storage units in a logical form over a single conductor cable that is also being used to send high voltage 110 volt, 60 cycle power to the instrument.

Figure 5:
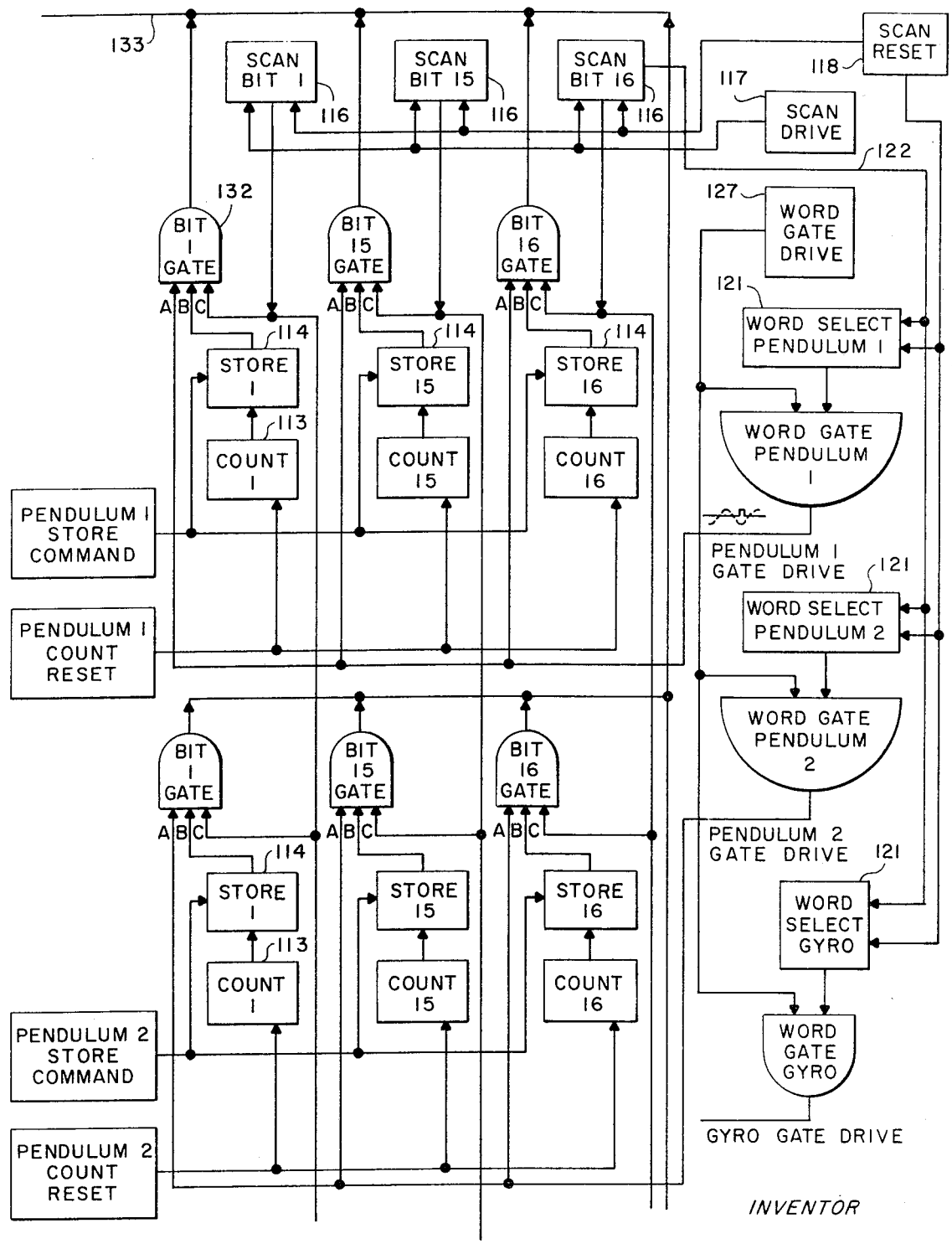
FIG. 5 is a schematic circuit diagram showing a system for reading out the stored data from the instrument section for transmission to the surface.

Referring now to FIG. 5, the circuit used to transfer the information stored in the memory of the system consists of 16 DC flip flops 116, also termed "scan bits", which are arranged in a ring configuration. Only the first and last two flip flops are shown in block diagram to simplify the drawing. Of all flip flops, only one output can be high at a time, that is have voltage, while all the others will be low or at zero. When a clock pulse is fed to the scan bit circuits from a scan drive 117, the high output will sequence a step to the next flip flop. A scan reset circuit 118 receives the line voltage and shapes a negative pulse for resetting portions of the circuit. One output of the scan reset is fed to the scan bit network. This output provides a trigger pulse to the ring configuration of flip flops to set a high output or one output as it may be called, on flip flop scan bit 1 and set the other flip flops to zero. Thereafter, the next clock pulse from scan drive 117 steps the one to scan bit 2, and the next clock pulse steps the one from scan bit 2 to scan bit 3, and so on through scan bit 16. The output of each individual flip flop 116 of the ring count is used as a gate signal to control the reading of the memory units of the pendulum 1 and pendulum 2 units, but for simplicity of the drawing and description, the gyro circuitry has been omitted, it being substantially the same as that shown for the pendulum units. The count and memory of each system consists of 16 bits of binary information. We may think of each 16 bit section as a word, and of the three words as a frame. To simplify bit insertion or data insertion on the power line, it is desirable to drive the 16 bit scanner with the power frequency. This also synchronizes the data pulses with the line frequency period. The reasons for this will be apparent hereinafter.

The system for reading out the information from the storage units 114 comprises a word select programmer 121 for each of the separate instrument sections, pendulum 1, pendulum 2, and gyro. Each of the word select programmers is a flip flop circuit. The programmers are arranged in a ring count configuration similar to the scan bit circuit. The resulting circuit is in the form of a three bit ring similar to the 16 bit ring, but instead of selecting an individual bit, it selects an entire 16 bit word. The word select programmer receives its clock pulse or command to step to the next word from the decaying signal of the 16 bit of the bit scanner. This decaying signal is provided from the 16 bit scan over a conductor path 122 to the individual word select programmers 121. The scan reset circuit 118 also provides an output to the word select programmers for setting word select (pendulum 1) to "ON" while setting the other word select programmers to zero. Activation of the reset circuit 118 to reset the scan bit ring and the word select ring will be described hereinafter.

Figure 6:
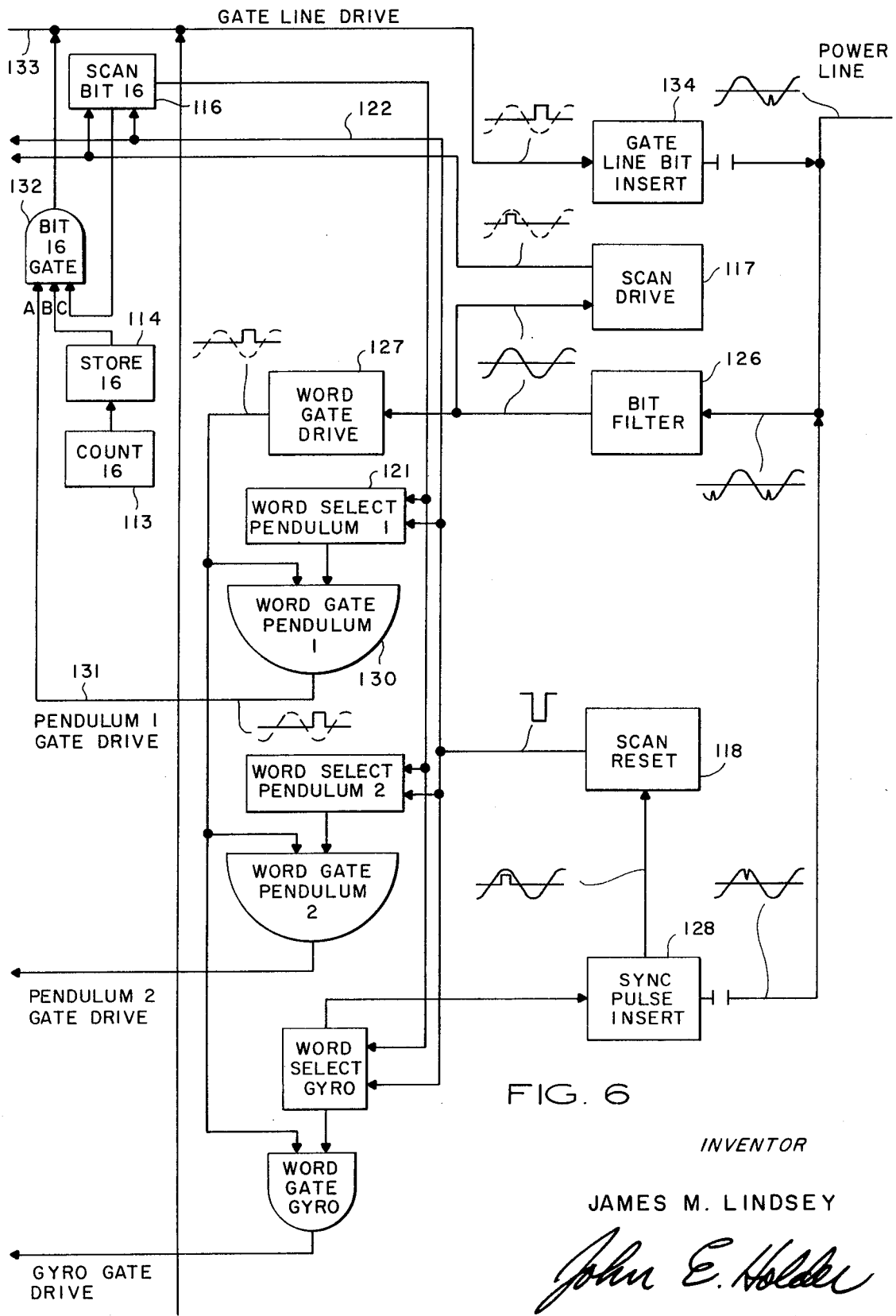
FIG. 6 is a schematic circuit diagram showing an extension of the system in FIG. 5 for coding such data for transmission to the surface.

Referring now to FIGS. 5 and 6 of the drawings, the circuit diagram shows a portion of the AC signal, which is used to power the instrument being tapped off the line and sent to a bit filter circuit 126. The line signal at this point has already been pulsed by data from the scan bit circuit. (This operation will be described hereinafter). Therefore, in order to use the line signal for other control purposes, it is in this case necessary to filter any bits of information or other spurious signals and send a clean signal of power line frequency to the scan drive circuit 117. This so called clean signal is also sent to a word gate drive circuit 127. The scan drive circuit is in the form of a pulse shaping circuit which is driven by the resulting sign wave from the bit filter circuit 126. The scan drive circuit 117 removes the 60 cycle sign wave, and in synchronism with the wave, places a narrow square wave pulse (one millisecond) on the line at plus 90°. This square wave pulse is fed to the scan bit ring counter to step the ring counter one step for each pulse. The scan drive, in other words, selects the positive going portion of the signal and shapes it into a one millisecond wide pulse that occurs at 90° with respect to the 360° period of the signal. This pulse occurs at every period of the line frequency and is used to drive the 16 bit ring scan counter.

When power is first applied to the system, it causes the scan bit ring counters 116 and the word select programmers 121 in ring count configuration to step through their entire sequence, this taking place in only a few milliseconds. Upon termination of the sequence in the word select programmers, a decaying signal from the gyro word select programmer activates a sync pulse insert 128 which in turn drives the scan reset 118 to reset or turn on the word select for pendulum 1 and also to provide a positive or one signal on scan bit 1. The sync pulse insert 128 is a pulse shaping and amplifying circuit which sends a square wave pulse to the scan reset 118. As will be described later, the sync pulse insert also places a sync pulse in the form of a spike on the line power.

The bit filter 126 also sends a portion of its output signal to the word gate drive 127. The word gate drive is a pulse shaping circuit which selects a negative going portion of the signal and shapes it into a one microsecond pulse that occurs on the negative portion of the line frequency at 270° with respect to the 360° period of the signal. These pulses are occurring at the same frequency as those emerging from the scan drive 117 to drive the scanner, but they occur at different points on the period of the line power. The pulses from the word gate drive 127 are sent to word gates 130 which are two input AND gates associated with each of the word select programmers. The signal from word gate drive 127 is sent, for example, to the word gate drive for pendulum 1, which is controlled by the word select programmer 121 for pendulum 1. When the word select programmer output is positive, then a pulse from the word gate drive is passed through the word gate 130 to a bit gate line 131, common to a bit gate 132, associated with each of the 16 bits.

Each of the bit gates has three inputs which are designated A, B, and C. If there is a voltage or "ONE" on input C which is derived from scan bit 1, and if at the same time there is a voltage on input B from the storage flip flop 114, that is if there is a "ONE" stored on the storage unit, then the two positive voltages on inputs B and C cause the bit gate 1 to open and pass the 270° positive square wave pulse from word gate 130 through the bit gate 132 to a gate line drive path 133, and from there to a gate line bit insertion circuit 134. On the other hand, if either the scan bit 116 has a low voltage or zero, or if the storage unit 114 has a zero voltage, then the associated bit gate 132 does not pass the word gate pulse, so that no pulse is received on the gate line drive at that point of time on the line signal. The scan drive 117 steps the scan bits from 1 through 16, with the same process taking place as set forth above so that when the gate bit associated with a scan bit sees a voltage in the associated storage unit, this causes a pulse from the word gate to pass on to the gate line drive and thus to the bit insert 134. When all 16 bits of the pendulum No. 1 network have been read, the decaying signal from scan bit 16 causes the word select programmer to step to pendulum 2 and the process is repeated for the 16 scan bits of pendulum 2 and so on.

The bit insertion circuit 134 is an amplifier that has in its output a high voltage PNP power transistor with a capacitive collector load 136 in series with the high voltage line to the surface. The line voltage goes negative at 270° so that a negative potential is available at the collector of the power transistor. The negative square wave pulse at 270° which was placed on the gate line drive to indicate information stored in the store and count section of the circuit is used to cause saturation of this transistor, which in turn causes a spike to appear on the line at 270°. In other words, the gate line bit insert circuit 134 changes the square wave pulse at 270° to a spike, and superimposes it on the power line 137 at the negative going portion of the sine wave, as shown by the diagrammatic sine wave on the line.

A similar means is used for inserting a synchronous pulse on the power line at 90° to enable a distinction between the starting and stopping points of a frame. Each frame is comprised of three series of 16 bit words from each instrument data storage section so that a frame as defined herein is comprised of a beginning and ending sync pulse and 48 bits therebetween.

Figure 7:
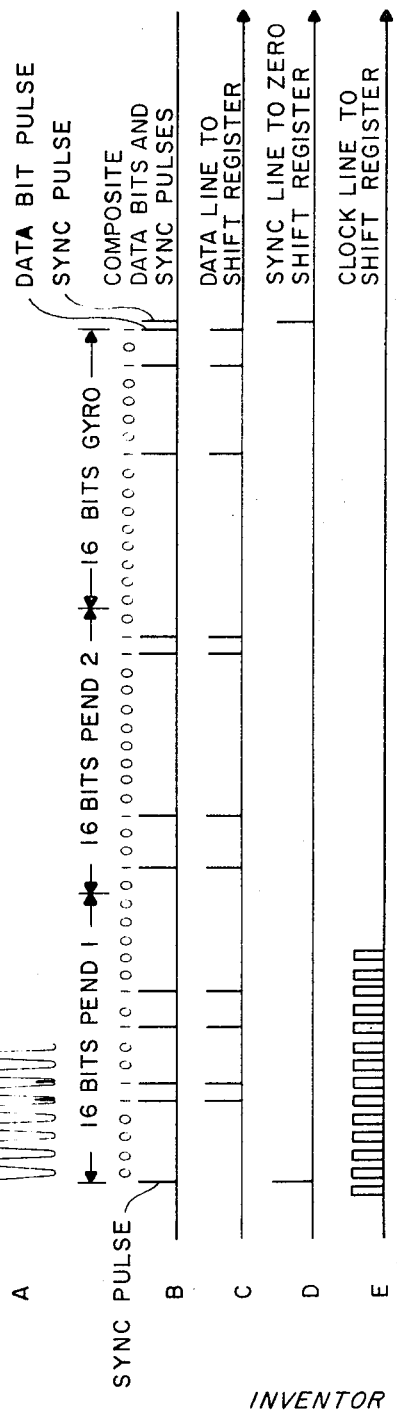
FIG. 7 is a schematic drawing depicting waveforms and pulses as they appear on the above circuits.

Referring to FIG. 7 of the drawings, a schematic representation of the line signal is shown at A. Each period of the signal is considered one bit of information with the first 16 bits comprising the first word, and the second 16 bits comprising the second word, etc., with the total of 48 bits comprising three words, or one frame. Each frame begins and ends with a sync pulse 138 on the positive going portion of the wave. The sync pulse insertion is accomplished with a pulse shaping and amplifying circuit 128 which generates a positive going square wave pulse at 90°. This sync pulse has a dual function, one of which is accomplished by feeding the pulse to the scan reset 118 (FIG. 6). The sync pulse circuit 128 also is comprised of a transistor with a capacitive collector load similarly to the gate line bit insert described hereinbefore. This circuit similarly produces a synchronous pulse in the form of a spike except in this case a plus 90° position on to the power signal, wherein data spikes were positioned at 270° or a negative going portion of the wave form. The sync spike is shown in FIG. 7 on a positive going portion of the wave, and occurs at the beginning and end of the frame.

Referring again to FIG. 6, the square wave positive pulse which is formed by the sync pulse insert 128 in time relationship with the 90° position on the power signal is sent to the scan reset 118 to accomplish its second function. This pulse is transformed by the scan reset into a negatively going square wave pulse to reset the ring count circuits. In other words, the signal from the scan reset 118 is sent to the word select programmers 121 and also to the scan bit flip flops 116. This output signal resets the scan bit ring by turning on the flip flop of scan bit 1 and setting the others to zero. At the same time, the same signal sets the word select programmer for pendulum 1 to an "ON" condition and sets the other word select programmers to zero.

The sync pulse which initiates the sequence of events described above originates in the decaying portion of the signal from the word select programmer in the gyro circuit. As the gyro circuit sequences from a high (which means data in the gyro memory is being read out) on its output to a low on its output, the decaying signal is sent to the sync pulse insertion circuit 128. The sync pulse circuit 128 has as its output an NPN power transistor with a capacitive collector load in series with the line. This, as described above, triggers the NPN transistor into saturation to cause a spike to appear on the positive 90° portion of the power line frequency. Also, the pulse derived from the sync pulse insertion circuit is used to reset the circuits as described above to insure only one bit of the 16 bit scanner and three word select scanner has an output or voltage at the start of each new scan. When circuit voltage is first applied to the scanner circuit, an output may occur on several of the flip flops, which would then be sequenced through the scanner ring. However, it is desirable for only one scan bit to have an output on each scanner. In order to provide this feature, upon turning on of the circuit, a high or voltage will sequence through the gyro word select. The decaying portion of the high causes a sync pulse to be generated from the sync pulse insertion circuit 128 and put on the line. This sync pulse is also sent from the sync pulse insert to the scan reset which sets a high into the first scan bit and also into the first word select programmer.

The overall operation of the data storage and read out circuit described above may be described by way of example. If the word select programmer 121 for pendulum 1 is high, (having a voltage thereon) the one millisecond pulses occurring on each wave in time relation to the 270° position, are presented to the bit gates 132. If the corresponding scan bit 116 is high and the memory storage is high, the 1 millisecond pulse (at 270°) is passed onto the gate line drive 133 as a one. If the memory storage is low, then a zero or no pulse (at 270°) is passed onto the line. We thus pass onto the line a composite signal consisting of the 60 second power frequency with data superimposed on the positive 90° portions that relates to the frame start and stop, and data on the negative 90° (270°) portions that relates to the information stored within the system.

At the surface, the composite signal, represented by line A in FIG. 7, is passed through a data processing system as shown in FIG. 8 of the drawings. Referring to FIG. 8, the line 137 from the subsurface equipment is shown connecting with a sine wave rejection circuit 141. The sine wave rejection circuit rejects the 60 cycle component of the sine wave to provide data pulses as represented by line "B" in FIG. 7. The resulting data pulses which are synchronous with 270° positions on the line signal, and sync pulses at 90° are then sent to a data processing circuit 142. In the data processing circuit the sync pulses are separated from the data pulses by comparing the pulses with the line frequency. Those pulses that occur on the positive 90° portion of the signal are separated from those that occur on the minus 90° (270°) portion, and put on separate lines.

The data pulses thus emerge from the data processing circuit on line 143 as represented by line C in FIG. 7. The sync pulses on the other hand emerge on line 144 as represented by line D in FIG. 7. The line frequency is also fed to a clock or wave shaping circuit 146 which shapes the negative 90° (270°) portion of the line frequency into a positive going square wave pulse, as represented schematically on line 147 and line E of FIG. 7. This square wave pulse is used as a clock signal to shift the incoming data pulses on line 143 into a shift register 148. The shift register stores the binary data in the form it is received from the downhole count and store system thus retaining the identity of the number counted by the system at the downhole location. The synchronous pulses emerging from the data processing circuit on line 144 are used to reset the shift register to zero. The output from the shift register is sent to a storage system 151 within a computer 152 for performing calculations on the accumulated data determinative of borehole information.

The system described above provides new data on all three words (or a new frame) every three seconds. This data is in the form of 48 bits of binary information which is read out at a rate proportional to the period of the power line frequency. If the line frequency is 60 cycles per second, which has a period of 16.6 milliseconds, then it takes 796.8 milliseconds to read out all 48 bits of data in the memory and put in on the line. Since the scanner that reads the information is continuously scanning we will get three read-outs approximately, of data from each scan. This non-destruct type of read-out is desirable for looking at a series of readings and detecting any missing or added bits. The computer for processing the data is programmed to look at the 3 data bits read during each scan and compare the data bits. If there is a difference between the data bits, it rejects all of them, thus eliminating any error due to noise.

Although described with respect to surface recording, it is readily seen that the apparatus described herein would be compatible for use with downhole recording equipment for subsequent transmission to the surface in a manner similar to that described herein. Therefore, while particular embodiments of the present invention have been shown and described, it is apparent that changes and modifications may be made without departing from this invention in its broader aspects, and therefore, the aim in the above description is to cover all such changes and modifications as fall within the true spirit and scope of this

What is claimed is:

1. In a position sensing and indicating apparatus for use in a borehole and having a single conductor for supplying power from the surface to said apparatus and transmitting detected data to the surface, said downhole instrument means comprising; means for generating pulses and passing said pulses into a circuit system; means for gateing the passage of said pulses into said circuit system in time relation with the magnitude of the detected parameter; means in said circuit system for counting the pulses passed into said circuit system; and means for transmitting said counted pulses to the surface over said single conductor.

2. The apparatus of claim 1 and further including downhole means in said circuit system for storing said counted pulses as data.

3. The apparatus of claim 2 wherein said downhole instrument means further includes data switching means responsive to the presence of stored data for placing coded pulses on said single conductor, and surface means for decoding said coded pulses to provide said data at the surface.

4. The apparatus of claim 3 wherein said power for operating said instrument means is in the form of an alternating current wave and said coded pulses are passed through said system in time relation with a predetermined position on the period of said wave.

5. The apparatus of claim 4 and further including data insertion means for placing an anomaly on said wave to form said coded data pulses.

6. The apparatus of claim 5 and further including means for placing a second anomaly on said wave at a different position relative to the period of said wave to produce a synchronization signal at the surface.

7. In apparatus for use in a borehole, downhole means for detecting a plurality of parameters in the borehole and transmitting detected data to the surface, said downhole means including single conductor means for supplying power to said detecting means; means for generating pulses and passing said pulses into a circuit system; means responsive to the downhole detecting means for gateing the passage of pulses from said pulse generating means into said circuit system in proportion to the magnitude of said detected parameters; means in said circuit system for storing said counted pulses as coded data for each detected parameter; and means for sequentially transmitting the coded data from said storing means to the surface over said single conductor.

8. The apparatus of claim 7 wherein said storing means includes separate storage sections for each detected parameter.

9. Apparatus for use in a borehole, including: means for detecting a plurality of wellbore parameters; means for connecting said detecting means with the surface; means for providing data pulses indicative of each of such parameters; means for storing a plurality of data bits derived from said data pulses and representative of the magnitude of a detected parameter, with separate of such storing means being provided for each parameter detected; scanning means for determining the presence or absence of data bits within said storing means; and program means for sequentially applying said scanning means to such separate storing means.

10. The apparatus of claim 9 and further including means for transmitting data signals representative of such scanned data bits to the surface over said connecting means.

11. The apparatus of claim 10 wherein said connecting means includes a single conductor cable which carries a power supply signal from the surface to said detecting means.

12. The apparatus of claim 11 wherein said transmitting means includes means for superimposing said data signal on said power supply signal for transmission to the surface over said single conductor cable.

13. The apparatus of claim 12 and further including means for generating synchronization signal, and means for superimposing said synchronization signal on said power supply signal at predetermined intervals to provide detectable divisions in the transmission of said data signals.

14. The apparatus of claim 13 and further including means for differentiating between said data signals and said synchronization signals, and means for recording said data signals.

15. The apparatus of claim 10 wherein said program means includes a plurality of gate means arranged in a configuration for repeatedly operating in sequence to apply said scanning means to such separate storing means.

16. The apparatus of claim 15 and further including means responsive to the operation of one of said gate means for generating a synchronization signal to be transmitted to the surface over said connecting means.

17. The apparatus of claim 9 and further including means for counting said data pulses and wherein said separate storing means are each comprised of a series of storage units for storing said data bits, said data bits being indicative of the number of such counted data pulses.

18. The apparatus of claim 17 wherein said scanning means sequentially determines the presence or absence of data bits within said storage units, and further including means for applying a data signal to said connecting means indicative of the presence or absence of the data bits within said storage units.

19. The apparatus of claim 18 wherein said connecting means includes conductor means for supplying a power signal to said borehole apparatus, and further including means responsive to the frequency variations of said power signal for sequentially operating said scanning means and said program means.

20. The apparatus of claim 19 wherein said data signal is superimposed on said power signal at a position corresponding with one of the positive and negative peak amplitudes of said power signal.

21. The apparatus of claim 20 and further including means responsive to the sequential operation of said program means for superimposing a synchronization signal on said power signal at a position corresponding with the other of the positive and negative peak amplitudes of said power signal.

22. The apparatus of claim 9 and further including a first series of switch means for operating said scanning means, a second series of switch means for operating said program means, and means responsive to the last switch means in said second series for sequencing said first and second series to the first switch means of each series.

23. The apparatus of claim 22 wherein said first and second series of switch means are comprised of an array of flip flops in ring configuration.

24. Apparatus for detecting wellbore parameters and passing signals indicative of such parameters to the surface over a single conductor, including: downhole parameter detecting means; means for providing a power signal to the parameter detecting means; downhole circuit means for superimposing first and second signals on said power signal, said first signal being time correlated with a particular portion of the period of said power signal and said second signal being time correlated with a different particular portion of the period of said power signal; surface means for separating said first and second signals from said power signal; and means for comparing said separated first and second signals with the period of the power signal to differentiate between said first and second signals.

25. The apparatus of claim 24 and further including means for registering said first and second signals in a manner indicative of detected wellbore parameters.

26. A method of detecting wellbore data and transmitting such data to the earth's surface, including the steps of: providing a power signal to wellbore data detecting apparatus; detecting wellbore data; providing electrical data signals indicative of such detected data; superimposing such data signals on the power signal to form a combined signal; such data signals being positioned on such power signal in a particular timed relationship with the period of such power signal providing a synchronization signal which is positioned with respect to such power signal in a different time spaced relationship with respect to the period of such power signal to provide a marker in said combined signal between data signal portions; passing such combined signal to the surface; and comparing such combined signal with the power signal period to separate such data signal from such combined signal.

27. The method of claim 26 and further including the step of transforming such data signal into indicia determinative of detected wellbore data.

28. The method of claim 26 wherein said synchronization signal is used for separating such data signal portions.

29. A method for detecting wellbore parameters and providing surface indications of such parameters, including the steps of: passing a power signal from the surface to a downhole detecting system over a conductor; generating a series of downhole electrical pulses; gateing the passage of said pulses into an electrical system in proportion to the magnitude of such detected parameters; counting the number of pulses gated into such electrical system; storing coded data indicative of the number of counted pulses in a data storage system; sequentially scanning such data storage system for the presence of such coded data; providing data signals indicative of such coded data; and passing such data signals over such conductor to the surface.

30. The method of claim 29 and further including the steps of providing a synchronization signal, and passing such synchronization signal over such conductor to the surface for separating data signal portions.

31. The method of claim 30 and further including the steps of separating such data signal and synchronization signal from such power signal at the surface.

32. The method of claim 31 and further including the step of comparing such data signals and synchronization signal with such power signal to differentiate such data signal and synchronization signal.

33. A method of measuring the angular and directional orientation of a borehole, including the steps of; suspending angular and directional orientation measuring instruments in a borehole on a single conductor cable; passing a power signal to such instruments over the single conductor cable; detecting angular and directional parameters of the wellbore; generating downhole signals indicative of such detected parameters; superimposing such downhole generated signals on such power signal in a predetermined timed relationship with the period of such power signal; and passing such superimposed signals to the surface over the single conductor cable.

34. The method of claim 33 wherein the angular parameters measured include the angular deviation from vertical of the instruments in planes 90° to one another and further including the steps of separating the superimposed signals from the power signal to provide data indicative of the angular directional parameters; vectorially summing the angular deviations; and applying directional parameters to such summation to provide an accurate measure of the borehole orientation.

35. A method of measuring the directional characteristics of a borehole, including the steps of: placing a measuring instrument in the borehole, passing a power signal over a conductor path to the instrument in the borehole; generating signals in response to measured borehole characteristics, superimposing the generated signal on the power signal at a predetermined position with respect to the period of the power signal to form a combined signal; passing such combined signal to the surface over the conductor path; and comparing the combined signal with the power signal to separate the generated signal indicative of borehole characteristics.

* * * * *